(12) United States Patent
Fuxman et al.

(10) Patent No.: US 9,384,233 B2
(45) Date of Patent: *Jul. 5, 2016

(54) PRODUCT SYNTHESIS FROM MULTIPLE SOURCES

(71) Applicant: Microsoft Corporation, Redmond, WA (US)

(72) Inventors: Ariel Fuxman, Mountain View, CA (US); Hoa Nguyen, Salt Lake City, UT (US); Juliana Freire de Lima e Silva, Salt Lake City, UT (US); Stelios Paparizos, San Jose, CA (US); Rakesh Agrawal, Redmond, WA (US); Zhimin Chen, Redmond, WA (US); Lawrence William Colagiovanni, Issaquah, WA (US); Prakash Sikchi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/693,040

(22) Filed: Dec. 4, 2012

(65) Prior Publication Data

US 2013/0091159 A1    Apr. 11, 2013

Related U.S. Application Data

(63) Continuation of application No. 12/764,676, filed on Apr. 21, 2010, now Pat. No. 8,352,473.

(51) Int. Cl.
*G06F 17/30* (2006.01)
*G06Q 30/02* (2012.01)
*G06Q 30/06* (2012.01)

(52) U.S. Cl.
CPC ...... *G06F 17/30386* (2013.01); *G06Q 30/0281* (2013.01); *G06Q 30/0603* (2013.01)

(58) Field of Classification Search
CPC .............. G06F 8/71; G06F 17/30286; G06F 17/30893; G06F 17/30905; G06F 3/048; G06F 8/36; G06F 17/30386; G06F 17/5022; G06F 8/24; G06F 8/34; G06F 9/4443;

(Continued)

(56) References Cited

U.S. PATENT DOCUMENTS

| 6,912,505 B2 | 6/2005 | Linden et al. |
| 7,082,426 B2 | 7/2006 | Musgrove et al. |

(Continued)

FOREIGN PATENT DOCUMENTS

| AU | 2011242753 B2 | 10/2011 |
| JP | 2001202450 A | 7/2001 |

(Continued)

OTHER PUBLICATIONS

"First Office Action Received in Australia Patent Application No. 2011242753", Mailed Date: Feb. 10, 2014, 3 Pages.

(Continued)

*Primary Examiner* — Shyue Jiunn Hwa
(74) *Attorney, Agent, or Firm* — Dave Ream; Tom Wong; Micky Minhas

(57) ABSTRACT

Methods and systems for automatically synthesizing product information from multiple data sources into an on-line catalog are disclosed, and in particular, for automatically synthesizing the product information based on attribute-value pairs. Information for a product may be obtained, via entity extraction, feed ingestion, and other mechanisms, from a plurality of structured and unstructured data sources having different taxonomies and schemas. Product information may additionally or alternatively be obtained or derived based on popularity data. The product information may be cleansed, segmented and normalized. The product information may be clustered so closest products, attribute names and attribute values are associated. A representative value for an attribute name may be determined, and the on-line catalog may be updated so that entries are comprehensive, meaningful and useful to a catalog user. Updates from at least 500 million different data sources may be scheduled to occur as frequently as several times daily.

20 Claims, 10 Drawing Sheets

(58) Field of Classification Search
CPC ... G06F 15/76; G06F 17/246; G06F 17/3071; G06F 17/241; G06F 17/27; G06F 17/2715; G06F 17/30616; G06F 17/2745; G06F 17/30067; G06F 17/3043; G05F 17/30566; G06F 17/30598; G06F 17/30731; G06F 17/30864; G06Q 30/02; G06Q 30/0641; G06Q 30/0603; G06Q 30/0601; G06Q 30/06; G06Q 30/0631; G06Q 30/0253; G06Q 30/0254; G06Q 30/0255; G06Q 30/0256; G06Q 30/00; Y10S 707/99945; Y10S 707/99933; Y10S 707/00043; Y10S 707/99934; Y10S 707/99944; H04L 67/02; H04M 2215/2026; H04M 2215/32; H04W 4/24; H04W 4/26; B66C 13/18; B66C 1/663; C11D 3/0036
USPC ...................................................... 707/759
See application file for complete search history.

(56) References Cited

U.S. PATENT DOCUMENTS

| | | | |
|---|---|---|---|
| 7,490,109 B1* | 2/2009 | Sikchi | G06F 17/30067 |
| 7,636,677 B1 | 12/2009 | McGonigal et al. | |
| 7,970,767 B2* | 6/2011 | Probst | G06F 17/241 |
| | | | 707/739 |
| 8,065,198 B2 | 11/2011 | Fuxman et al. | |
| 2002/0059204 A1 | 5/2002 | Harris | |
| 2005/0033664 A1 | 2/2005 | Moon et al. | |
| 2006/0136309 A1* | 6/2006 | Horn | G06Q 10/087 |
| | | | 705/26.8 |
| 2006/0271449 A1 | 11/2006 | Oliver et al. | |
| 2007/0214140 A1 | 9/2007 | Dom et al. | |
| 2007/0260520 A1* | 11/2007 | Jha | G06Q 30/02 |
| | | | 705/14.44 |
| 2007/0299743 A1* | 12/2007 | Staib | G06Q 10/107 |
| | | | 705/7.33 |
| 2008/0097843 A1 | 4/2008 | Menon et al. | |
| 2008/0154745 A1 | 6/2008 | Chan et al. | |
| 2008/0208713 A1* | 8/2008 | Vadlamani | G06Q 30/0601 |
| | | | 705/27.1 |
| 2010/0082657 A1 | 4/2010 | Paparizos et al. | |

FOREIGN PATENT DOCUMENTS

| | | |
|---|---|---|
| JP | 2001243234 A | 9/2001 |
| JP | 2002269451 A | 9/2002 |
| JP | 2006527886 A | 12/2006 |

OTHER PUBLICATIONS

"Second Office Action Received in Chinese Patent Application No. 201180019971.5", Mailed Date: Mar. 25, 2014, 5 Pages. (w/o English Translation).
"Notice of Allowance Issued in Japanese Patent Application 2013-506280", Mailed Date: Jan. 21, 2015, 4 Pages.
AU-2011242753, Notice of Acceptance, mailed May 29, 2014, 1 page.
CN-201180019971.5, Notice of Allowance, mailed Jul. 18, 2014, 2 pages.
Omar Benjelloun, et al., "Swoosh: a generic approach to entity resolution", Mar. 2, 2005, 20 pages.
Trevor Hastie, et al., "The Elements of Statistical Learning Data Mining, Inference, and Prediction", Springer, Feb. 2009, 763 pages.
Gerard Salton and Michael J. McGill, "Introduction to Modern Information Retrieval", 1983, 16 pages.
Michael Wick, et al., A Unified Approach for Schema Matching, Coreference and Canonicalization, Aug. 24-27, 2008, 9 pages.
Alexander Bilke and Felix Manumann, "Schema Matching using Duplicates", Data Engineering, ICDE 2005, 12 pages.
Chaudhuri et al., "Data Debugger: An Operator-centric Approach for Data Quality", IEEE, 2006, ftp://ftp.research.microsoft.com/pub/debull/A06June/AllPaper1.ps, pp. 1-7.
Halevy, A., "Why Your Data Won't Mix: Semantic Heterogeneity", Retrieved Date: Feb. 22, 2010, http://www.cs.washington.edu/homes/alon/files/acmq.pdf, pp. 1-7.
Rahm et al., "A Survey of Approaches to Automatic Schema Matching," VLDB Journal 10:334-351, 2001, http://citeseerx.ist.psu.edu/viewdoc/download?doi=10.1.1.16.700&rep=rep1&type=pdf, pp. 1-17.
Popa et al., "Translating Web Data," VLDB'02, 2002, http://www.almaden.ibm.com/cs/people/fagin/vldb02.pdf, pp. 1-12.
Naumann et al., "Data Fusion in Three Steps: Resolving Schema, Tuple, and Value Inconsistencies," IEEE, 2006, http://209.85.229.132/search?q=cache:gaPwqYkyOUgJ:ftp://ftp.research.microsoft.com/pub/debull/A06June/Hummer_DEBull06_v2.ps+%22Data+Fusion+in+Three+Steps:+Resolving+Schema,+Tuple,+and+Value+Inconsistencies%22&cd=1&hl=en&ct=clnk, pp. 1-15.
Fellegi et al., "A Theory for Record Linkage," Journal of the American Statistical Association, Dec. 1969, http://www.cs.washington.edu/education/courses/590q/04au/papers/Felligi69.pdf, pp. 51-79.
Elmagarmid et al., "Duplicate Record Detection: A Survey," Aug. 2006, http://www.cs.purdue.edu/homes/ake/pub/survey2.pdf, pp. 1-40.
Agichtein et al., "Mining Reference Tables for Automatic Text Segmentation," KDD'04, Aug. 2004, http://www.mathcs.emory.edu/~eugene/papers/kdd04segmentation.pdf, pp. 1-10.
Bleiholder et al., "Data Fusion," ACM Computing Surveys, Dec. 2008, http://www.bioinf.jku.at/teaching/ss2010/se-inf/data_fusion_a1-bleiholder.pdf, pp. 1-41.
Rabiner, L., "A Tutorial on Hidden Markov Models and Selected Applications in Speech Recognition," IEEE, Feb. 1989, http://www.cs.ubc.ca/~murphyk/Bayes/rabiner.pdf, p. 257-286.
Dhamankar et al., "IMAP: Discovering Complex Semantic Matches between Database Schemas," SIGMOD, 2004, http://citeseerx.ist.psu.edu/viewdoc/download?doi=10.1.1.5.4117&rep=rep1&type=pdf, pp. 1-12.
Nguyen et al., "Product Synthesis for Web-Scale Catalogs," WWW2010, Apr. 2010, p. 1-9.
Agrawal et al., "Providing Time-Sensitive Information for Purchase Determinations," U.S. Appl. No. 12/463,831, filed May 11, 2009, p. 1-33.
U.S. Appl. No. 12/764,676, Non Final Office Action mailed Mar. 27, 2012, 35 pages.
U.S. Appl. No. 12/764,676, Notice of Allowance mailed Sep. 4, 2012, 35 pages.

* cited by examiner

Catalog (302)

| Brand | Model | Speed (308a) | Interface (310a) |
|---|---|---|---|
| Seagate | Barracuda | 5400 | ATA 100 |
| Western Digital | Raptor | 7200 | IDE 133 |
| Seagate | Momentus | 5400 | IDE 133 |
| Hitachi | 39T2525 | 7200 | ATA 133 |

Merchant (305)

| Product Description | RPM (308b) | Int. Type (310b) |
|---|---|---|
| Seagate Barracuda HD | 5400 | ATA 100mb/s |
| WD Raptor HDD | 7200 | IDE 133mb/s |
| Seagate Momentus | 5400 | IDE 133 mb/s |
| Hitachi model 39T2525 | 7200 | ATA 133 mb/s |

FIG. 3A

| Catalog Product | |
|---|---|
| Attribute Name | Value |
| MPN | HDT725050VLA360 |
| Manufacturer | Hitachi |
| Weight | 0.64 |
| Weight | 10.2 |
| Height | 2.6 |
| Depth | 14.7 |
| Header/Product Line | Hitachi Deskstar |
| Header/Model | T7K500 |
| Header/Compatibility | PC |
| Storage Hard Drive/Capacity | 500 |
| Storage Hard Drive/Interface Type | Serial ATA-300 |
| Storage Controller (2nd) / Type | None |
| Storage Controller / Type | None |
| Storage / Type | Hard drive |
| Storage Hard Drive / Buffer Size | 16 |
| Storage Hard Drive / From Factor | 3.5" x 1/3H |
| Storage Hard Drive / Data Transfer Rate | 300 |
| Storage Hard Drive / Spindle Speed | 7200 |
| Storage Hard Drive / Average Seek Time | 8.5 |
| Storage Hard Drive / Hard Drive Time | Internal hard drive |
| Miscellaneous / Vista Certification | Works with Windows Vista |
| Storage Hard Drive / From Factor (Short) | 3.5" |

| Merchant 2 | |
|---|---|
| Attribute Name | Value |
| Manufacturers Part Number | HDT725050VLA360 |
| Weight | 0.64 kg |
| Disk Size | 3.5" x 1/3H |
| Type | Hard drive- internal |
| Interface Type | Serial ATA-300 |
| Product Description | Hitachi Deskstar T7K500 - hard drive - 500 GB SATA-300 |
| Buffer Size | 16 MB |
| RPM | 7200 rpm |
| Capacity | 500 GB |
| Average Seek Time | 8.5 ms |
| Dimensions (WxDxH) | 10.2 cm x 14.7 cm x 2.6 cm |
| Data Transfer Rate | 300 MBps |
| Vista Certification | Works with Windows Vista |

| Merchant 1 | |
|---|---|
| Attribute Name | Value |
| Brand | Hitachi |
| EAN | 5.05175E+12 |
| Hard Disk Size | 500 |
| Manufacturer | Hitachi |
| Model | HDT725050VLA360 |
| Publisher | Hitachi |
| Release Date | 7/3/07 |
| Studio | Hitachi |
| Title | Hitachi 500GB S/ATA2 7200rpm Cache: 16MB, SATA 300 Hard Drive |

FIG. 4

| Data Source | Update Frequency | Scale of Input |
|---|---|---|
| Product Feeds | 1 per week | 500 M |
| Merchant offers | 2 per day | 500 M |
| Web Reviews | 1 per 20 days | 100 M |
| Popularity signals | Daily-Weekly | |

PRODUCT SYNTHESIS FROM MULTIPLE SOURCES

RELATED APPLICATIONS

This application is a continuation of and claims priority under 35 U.S.C. §120 to U.S. patent application Ser. No. 12/764,676, (U.S. Patent Publication No. US-2011-0264598-A1), filed Apr. 21, 2010.

BACKGROUND

This Background is intended to provide the basic context of this patent application and it is not intended to describe a specific problem to be solved. A highly comprehensive on-line product catalog is vital for e-commerce success. Keeping a product catalog current in the face of innumerable product introductions and new manufacturers can be a Herculean task. Typically, on-line catalogs build product entries by relying on product feeds and information from multiple sources. However, different merchants or other sources (such as review sites, manufacturer listings, etc.) may provide different subsets of information or data for a same product. Furthermore, the different sources may provide their product information using different schemas and with wide variation in how product attributes are represented. For example, different sources may use schemas that name product attributes differently (e.g. "dimensions" vs. "length," "width," and "height"). Different sources may describe the attributes differently (e.g. "megapixels" or "pixels"). From the perspective of a user of the product catalog, separate product listings for a same product from each supplying provider would be a suboptimal experience. Similarly, mere concatenation of duplicate conceptual product information would also be suboptimal. The wide diversity of types, structures of information and data itself from a wide variety and number of data sources provide a formidable challenge in populating product descriptions that are succinct, comprehensive, meaningful and useful to a user of an on-line product catalog.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of a method for automatically synthesizing product information from multiple data sources into an on-line catalog are disclosed. The method may include obtaining historical information for an existing product included in the catalog, where the historical information may be obtained from one or more sources. The method may also include determining a source-to-catalog correspondence based on attribute-value pairs found in the historical information and in the catalog, and determining attribute-value pair extraction between attributes and values in the historical information and the catalog. The method may include obtaining incoming product information that references existing or new catalog products from the same or other electronic data sources, and determining a source-to-source correspondence between different data sources. Additionally, the method may include clustering the incoming product information based on attribute-value pairs, extracting any attribute-value pairs determined based on the incoming information, adding the attribute-value pairs to the catalog schema (including determining a representative attribute value for an attribute name), and updating the on-line catalog with the representative attribute value.

Embodiments of a system for automatically synthesizing product information into an on-line catalog are disclosed. The system may include one or more computing devices, each having a memory and a processor. The memory may include instructions for providing at least the on-line catalog; a data acquisition component; a computation component including entity relationship, clustering and extraction components; a human input component; and a human input management component.

Embodiments of one or more computer-readable storage media comprising computer-executable instructions for automatically synthesizing products into an on-line catalog are disclosed. The computer-executable instructions may include instructions for obtaining historical information for an existing product included in the catalog from one or more data sources. The method may also include determining a source-to-catalog correspondence based on attribute-value pairs included in the historical information and in the catalog, and determining attribute-value pair extraction. The method may include obtaining incoming product information that references existing or new catalog products from the same or different data sources, and determining a source-to-source correspondence. Additionally, the method may include clustering the incoming product information based on attribute-value pairs, extracting attribute-value pairs (including determining a new association between an incoming attribute value and an existing or a new catalog attribute name), and displaying a catalog entry based on the new association

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein:

FIG. 3A illustrates an example of product information from an on-line catalog and from a merchant data source;

FIG. 4 illustrates an example of product information from two different merchants as synthesized for a comprehensive on-line catalog entry;

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
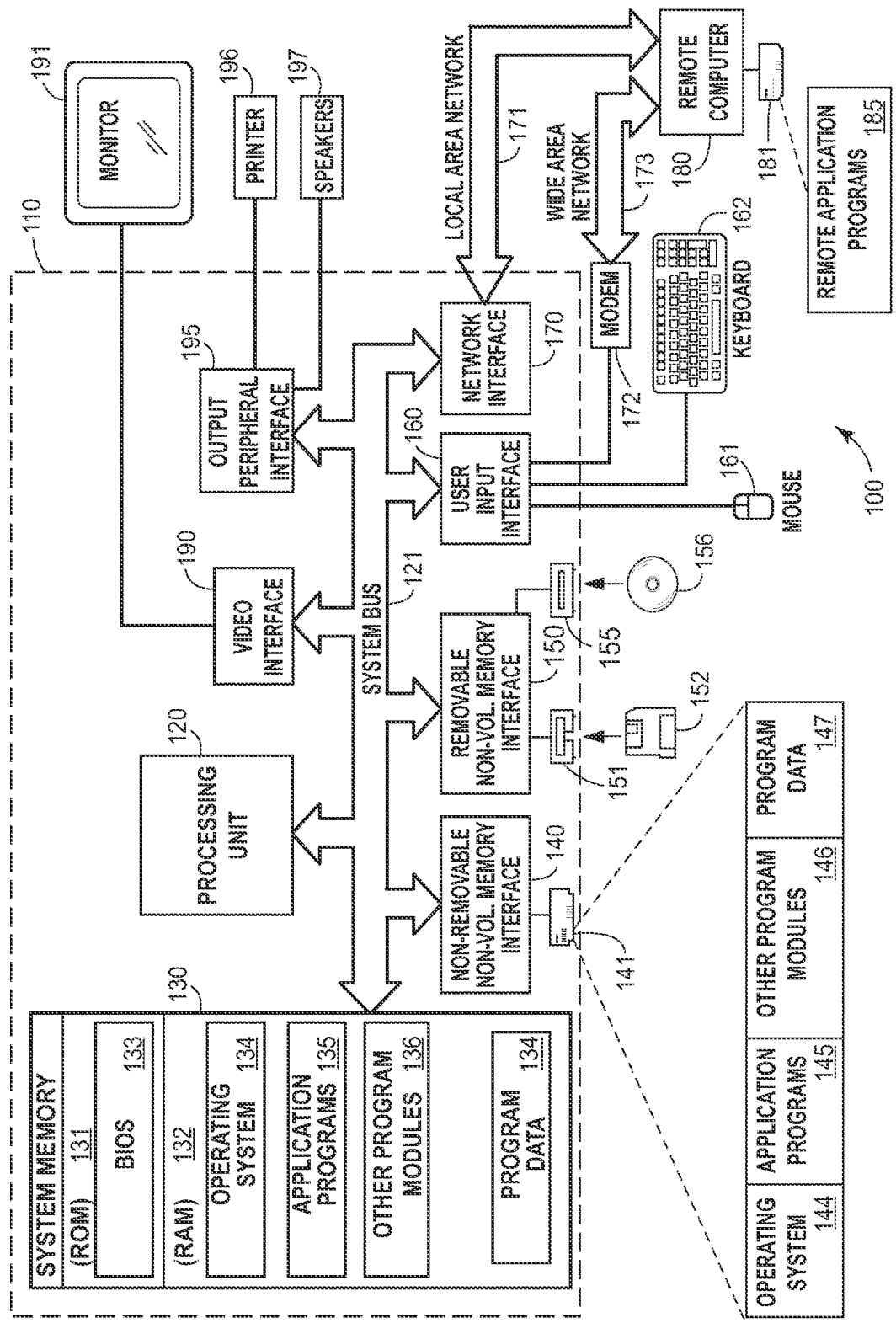
FIG. 1 is an illustration of a computing system environment.

FIG. 1 illustrates an example of a suitable computing system environment 100 that may operate to execute the many embodiments of a method and system described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150.

A user may enter commands and information into the computer 110 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Networks may be wireless, wired, or a combination of the two. Such networking environments are commonplace in offices, enterprise-wide computer networks, intranets, and the Internet.

Computing device 110 may encompass many different computing device configurations. For example, computing device 110 may realized in hand-held devices, mobile phones, multi-processor systems, microprocessor-based or programmable consumer electronics, network PCs, mini-computers, mainframe computers, portable computing or communication devices, and or other computing device capable of both visual display and direct or indirect communication with another computing device.

Figure 2:
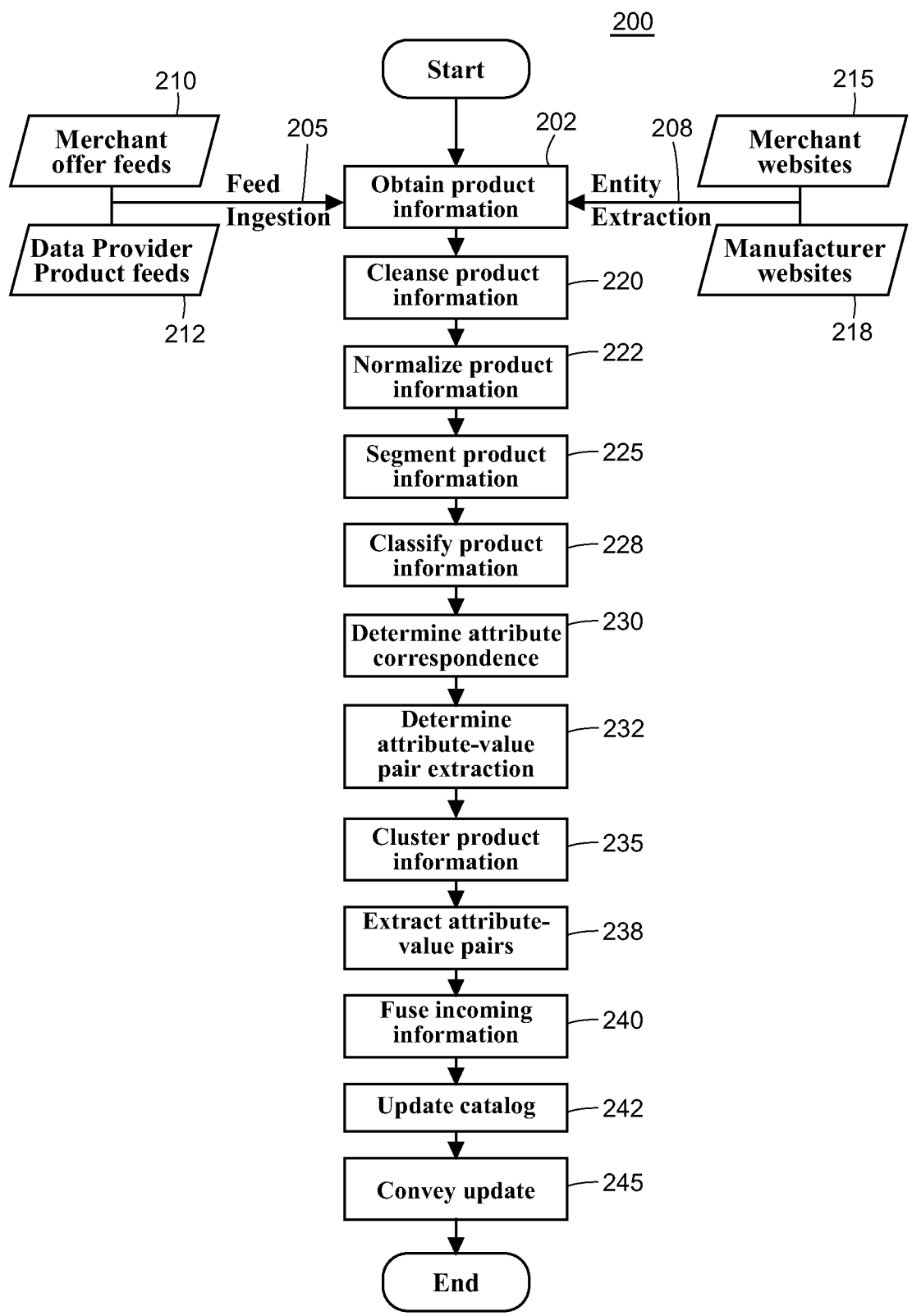
FIG. 2 depicts an embodiment of a method of automatically synthesizing product information from multiple data sources into an on-line catalog.

FIG. 2 depicts an embodiment of a method 200 of automatically synthesizing product information from data sources into an on-line catalog. The method 200 may be used in conjunction with the computing environment 100 of FIG. 1.

The method 200 may include obtaining product information 202 from a plurality of data sources. Product information may be obtained 202 by feed ingestion 205, for example, of RSS feeds, Atom format feeds, or other types of data feeds. Product information may alternatively or additionally be obtained 202 by entity extraction 208, such as by extracting data from websites and other entities via crawling, scraping, or other data gathering techniques. Generally, the entities from which data is extracted may be electronic data sources and may be accessed via the Internet and/or other public or private networks, including but not limited to cloud networks and peer-to-peer networks. Product information may additionally or alternatively be obtained 202 by reading from a database, by user entry, or by any other known means or method of obtaining electronic data.

In the embodiments illustrated in FIG. 2, the entities from which information corresponding to a particular product is obtained 202 may include electronic data sources such as merchant feeds of offers for sale 210, data provider product feeds 212, merchant websites 215, or manufacturer websites 218. For example, information corresponding to the particular product may be obtained from a textual description included in an offer feed or feed of one or more offers for sale 210, an image on a merchant website 215, or a user manual from a manufacturer's website 218. Information corresponding to the particular product may be obtained from FAQs (Frequently Asked Questions) and/or QnAs (Question and Answers). The data sources from which information is obtained 202 may not be limited to only merchant, provider and manufacturer related data sources 210, 212, 215 and 218. Although not illustrated in FIG. 2, the data sources may additionally or alternatively include data sources generated by third parties, such as review sentiments, product ratings, review helpfulness indicators, recommendations, opinion indexes, product hierarchies, or product rankings. The data sources of product information corresponding to the particular product may include shopping websites, videos, price prediction signals or data, still images, media clips, adjectives corresponding to products, and/or any of the aforementioned data sources as applied to other products that are related to the particular product. Still other data sources may include popularity-based data sources, signals, or data, such as frequency data from search engines and/or web browsers, click data from websites, and the like; popularity trending information from price and/or transaction data; or other popularity-based data. Just one of many possible embodiments for obtaining product information 202 may be found in co-pending U.S. patent application Ser. No. 12/463,831, filed on May 11, 2009 and entitled "Providing Time-Sensitive Information for Purchase Determinations," the entire disclosure of which is hereby incorporated by reference.

The obtained product information may include a set of attribute-value pairs for each product, with each attribute-value pair including an attribute name and an attribute value. The term "attribute name," as used herein, may be a name of an attribute associated with a product that typically describes one or more aspects of the product or designates a characteristic of the product. For example, for a laptop computer, attribute names may include "screen size," "hard disk size," and "weight." The term "attribute value," as used herein, may be a value for the attribute name corresponding to the product. For example, respective attribute values for the attribute names of the laptop computer may include "15.6 inches," "500 Gigabytes," and "7.6 pounds." Accordingly, the set of attribute-value pairs for the laptop may include {screen size-15.6 inches}, {hard disk size-500 Gigabytes}, and {Weight-7.6 pounds}. As used herein, the convention used for denoting an attribute-value pair is a set of two elements in curly brackets separated by a dash, with the first element denoting a text string or equivalent corresponding to the attribute name and the second element denoting a text string or equivalent corresponding to an attribute value. Similar to the obtained product information, each catalog entry may include a set of corresponding catalog attribute-value pairs, each including a catalog attribute name and a corresponding catalog attribute value.

The block 202 may include obtaining historical product information from a plurality of data sources, where the terms "historical product information" and "historical information," as used interchangeably herein, may each be product information known a priori to correspond to a catalog entry. The historical information may include one or more historical attribute-value pairs, where each historical attribute value pair includes a historical attribute name and a corresponding historical attribute value. In addition to or instead of obtaining historical product information, the block 202 may include obtaining incoming product information from a second plurality of data sources. The second plurality of data sources may include the same, different, or partially different data sources as the historical data sources and may include at least one new data source or a data source that includes information that has not been synthesized with the catalog. The terms "incoming product information" and "incoming information," as used herein, are used interchangeably and may each refer to product information where relationships of products referenced therein to any existing catalog product is unknown or has not been synthesized with the product catalog at the time of acquisition of the incoming information. In some embodiments of the method 200, obtaining historical product information and obtaining incoming product information may be performed at different times.

The method 200 may include cleansing the obtained product information 220. Cleansing the product information 220 may include correcting errors that are discovered within the obtained product information. Spelling errors may be corrected (e.g. "pollyester" may be corrected to "polyester"). Grammatical and typographical errors may be corrected (e.g. "wait" may be corrected to "weight," or "goldnecklace" may be corrected to "gold necklace") using known or future developed techniques. Other errors such as capitalization errors, encoding errors, and other errors may also be corrected when the product information is cleansed 220. In some embodiments of the method 200, cleansing the product information 220 may be optional and may be omitted.

The widely varying sources of data from which the product information is obtained 202 may use different schemas and taxonomies for describing a particular product. Thus, the product information obtained 202 for the particular product may be received in varying formats. Some of the product information may include unstructured data. Some of the product information may include structured data of a particular schema and/or taxonomy. For example, in the example of the laptop computer product, a first source may use a taxonomy that categorizes the laptop computer as a "laptop," and its schema may use attribute names such as "hard disk size" and "resolution." For the same laptop product, a second source may use a taxonomy that categorizes the laptop computer as a "portable computer," and, for the same conceptual attributes, its schema may use different attribute names such as "capacity" and "pixels." Other data sources may utilize non-textual representations from which attribute-value pairs may be determined, such as an image or a video clip. Synthesis of product information from such widely varying taxonomies, schemas, representations, and indeed, types of data sources poses a challenge that the methods and systems of the present disclosure elegantly address.

In particular, the method 200 may include normalizing the product information 222. In a typical embodiment, normalizing the product information 222 may include normalizing attribute names and/or attribute values, including determining a standardization of units, abbreviations, synonyms, acronyms, and common values. Generally, normalizing the product information 222 may include normalizing the product information 222 with respect to a taxonomy of the on-line catalog. For example and not limitation, an attribute "tan" may be recognized as a synonym for "beige" and may be so normalized 222. An attribute "megapixels" may be normalized to a catalog attribute "resolution." In other examples, the value "7.12 megapixels" may be normalized to "7.1 megapixels," the units "lbs." and "#" may be normalized to "pounds," and "0.6 meters" and "600 millimeters" may be normalized to "60 centimeters." Normalizing 222 may be performed on historical product information, incoming product information or on both. In some embodiments, historical and incoming product information may be normalized 222 at different times by the method 200. In some embodiments, normalizing the product information 222 may include using taxonomy and/or data modeling, machine-learning techniques, and/or linguistic analysis. For example, the method 200 may use linguistic analysis and learning techniques to determine that "tan" and "beige" are synonyms for a color attribute corresponding to a pair of pants, and may apply this to a color attribute corresponding to a pair of window shades, but not to a leather treatment attribute corresponding to a pair of cowboy boots. Just one of many possible embodiments for normalizing 222 product information may be found in co-pending U.S. patent application Ser. No. 12/235,635, filed on Sep. 23, 2008 and entitled "Generating Synonyms Based on Query Log Data," the entire disclosure of which is hereby incorporated by reference.

The method 200 may include segmenting the product information 225. In a typical embodiment, segmenting the product information 225 may include segmenting attribute names so that similar attribute names obtained from various data sources are segmented together. For example and not limitation, one particular offer feed for a step stool may include the attribute name "dimensions," and another offer feed may include the attribute names "height," "width," and "length." Segmenting the product information 225 may result in all four of these attribute names being segmented together. In another example for a container, attribute names "capacity" and "volume" from different sources may be segmented together. In some embodiments, segmenting the product information 225 may include extracting embedded information. For example and not limitation, one merchant may provide an ISBN of a book within a description attribute, while another merchant may list the ISBN as an attribute unto itself. Segmenting the product information 225 may map both merchants' respective references to the same conceptual ISBN of the book. Segmenting 225 may be performed on historical product information, incoming product information or on both. In some embodiments, historical and incoming product information may be segmented 225 at different times by the method 200.

The method 200 may include classifying product information 228. Classifying product information 228 may include matching a given product represented in the information obtained in the block 202 with one or more classifications or categories that are included in the on-line catalog taxonomy. Generally, a classification or a category may be some grouping of products within the catalog that may useful for narrowing down products to a user of the catalog. For example and not limitation, in the laptop computer example, the laptop computer may be classified 228 into a category of "electronics," a category of "portable computing devices," or a category of "laptop computing devices." In some embodiments of the method 200, classifying product information 228 may be optional and may be omitted. Classifying 228 may be performed on historical product information, incoming product information or on both. In some embodiments, historical and incoming product information may be classified 228 at different times by the method 200. Classifying product information 228 may include using machine learning techniques, web extraction, taxonomy and data modeling, and in some cases, human input.

The method 200 may include determining attribute correspondence 230. Determining attribute correspondence 230 may include determining a correspondence between attribute names of two different sources. In some embodiments, the two different sources may be two different non-catalog data sources. The terms "source-to-source attribute correspondence" and "source-to-source correspondence," as used interchangeably herein, may each include a correspondence between a particular attribute name used by a first data source (based on its taxonomy and/or schema) and another attribute name used by a second data source (based on its taxonomy and/or schema). For example, in the previous laptop example, determining source-to-source attribute correspondence may include determining that the attribute name "capacity" used by the first source corresponds to the attribute name "hard drive size" used by the second source.

In some embodiments, one of the two different sources may be the on-line catalog. Accordingly, the terms "source-to-catalog attribute correspondence" and "source-to-catalog correspondence," as used interchangeably herein, may each include a correspondence between the particular attribute name used by the first data source (including its taxonomy and/or schema) and an attribute name used in a taxonomy and/or schema of the on-line catalog. In the laptop example, determining source-to-catalog correspondence may include determining that an attribute name "RPM" (Revolutions per Minute) used by the first source corresponds to a catalog attribute name of "speed."

For an illustrative example of attribute correspondence, consider the information shown in FIG. 3A. In FIG. 3A, a first chart 302 includes information corresponding to hard drive products that are included in an on-line product catalog. A second chart 305 includes information corresponding to hard drive product offers for sale from a particular merchant. Note that in this example, straight attribute name matching is not sufficient to derive matches between the merchant schema and the catalog schema as the vocabulary used between the charts 302 and 305 is quite different. For example and not limitation, a conceptual attribute corresponding to a speed of the hard drive is referred to as "Speed" 308a by the catalog but is referred to as "RPM" 308b by the merchant. The conceptual attribute corresponding to an interface type is referred to as "Interface" 310a by the catalog, but is referred to as "Int. Type" 310b by the merchant.

Figure 3B:
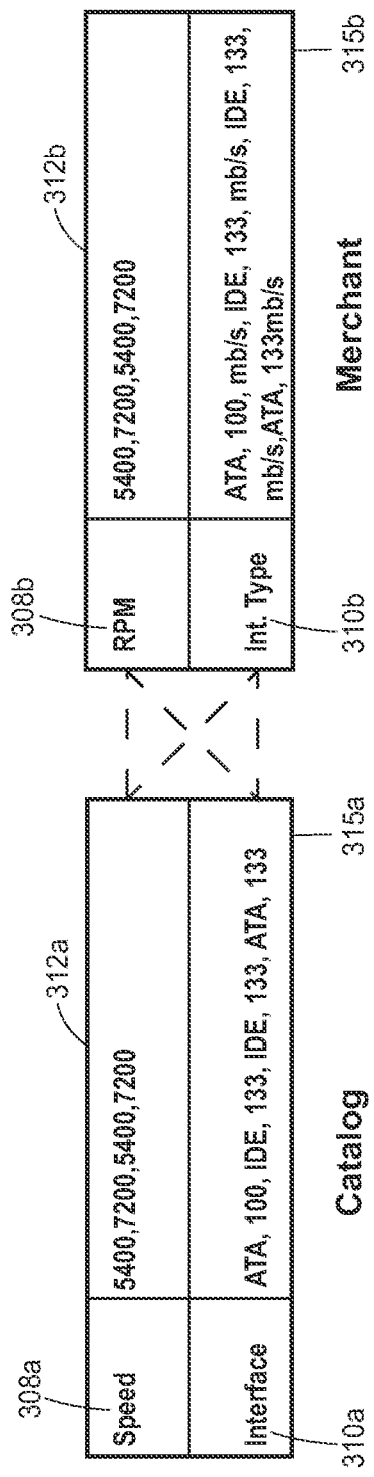
FIG. 3B depicts ranges of attribute values from the product information of FIG. 3A.

To determine attribute correspondence 230 between the catalog listing 302 and the merchant offers for sale 305, a range of words or values for each attribute name in the catalog and the merchant offers may be determined, and a word frequency distribution or value distance may be determined. To illustrate one possible embodiment, FIG. 3B depicts determined ranges or "bag" of words for each attribute name of FIG. 3A, including the set of possible values for each attribute name. In particular, the range or bag 312a corresponds to the values of the attribute name "Speed" 308a from the catalog 302 of FIG. 3A, the range or bag 315a corresponds to values of the attribute "Interface" 310a from the catalog 302, the range or bag 312b corresponds to values of the attribute "RPM" 308b from the merchant offers 305, and the range or bag 315b corresponds to values of the attribute "Int. Type" 310b for from the merchant offers 305.

Figure 3C:
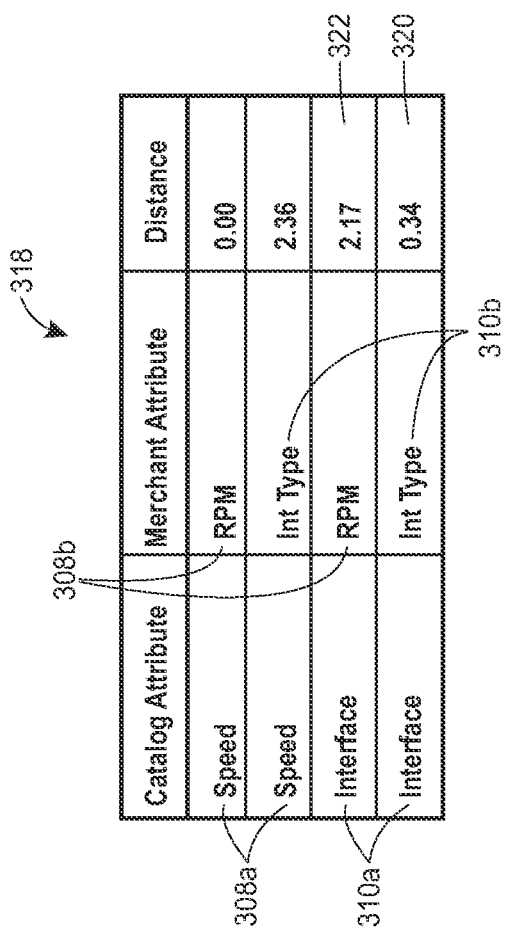
FIG. 3C depicts distances between the attribute values of FIG. 3B.

FIG. 3C includes a chart 318 that shows distance values for different combinations of catalog and merchant offer attributes of FIG. 3B. The chart 318 shows that the attribute "Interface" 310a from the catalog 302 is closer to the attribute "Int. Type" 310b from the merchant offers 305 than "Interface" 310a is to "RPM" 308b, i.e. a distance of 0.34 (reference 320) and 2.17 (reference 322), respectively. For the chart 318, the distances are determined as follows: if A is an attribute (either from the catalog or from some other data source) with a range or bag of values A that includes all words that appear in some data source for the attribute A, then a distribution for each word or term t may be:

$$p_A(t) = \frac{\text{number of times } t \text{ appears in } \mathcal{A}}{\text{total number of elements in } \mathcal{A}} \quad (1)$$

Value distributions for two attributes A and B may be determined by their Kullback-Leibler (KL) or information divergence:

$$KL(A\|B) = \sum_t p_A(t)\log\frac{p_A(t)}{p_B(t)} \quad (2)$$

The distance between A and B may be the minimum of the KL divergences between A and B and between B and A, as KL divergence is not symmetric:

$$\text{distance}(A, B) = \min(KL(A\|B), KL(B\|A)) \quad (3)$$

Accordingly, determining attribute correspondence 230 may include determining that a pair of attributes may be related if their distance is below a given threshold, e.g. distance(A, B)<threshold. Note that although the example of FIGS. 3A-3C determine a source-to-catalog correspondence between merchant offer and catalog attributes, one of ordinary skill in the art may easily determine attribute correspondence between any two sources of attributes including an on-line catalog, a merchant offer for sale, or any of the previously discussed data sources. Of course, determining distances between attributes is not limited to using the equations (1)-(3). Other embodiments of determining distances between attribute values, and indeed, other embodiments of determining attribute correspondence 230 may be contemplated and used in conjunction with the method 200.

Turning back to FIG. 2, the method 200 may include determining attribute-value pair extraction 232. Generally, determining attribute-value pair extraction 232 may be performed on historical product information to determine an association between an existing catalog attribute name and a non-catalog attribute value, and in a preferred embodiment, may include machine-learning the association. As each catalog entry for each product corresponds to a set of catalog attribute-value pairs, each catalog attribute-value pair may be included in or stored in conjunction with the catalog schema. Typically, however, an attribute-value pair from a schema of a non-catalog data source may not exactly match a catalog attribute-value pair. For example and not limitation, the on-line catalog schema may include two different attribute names "Memory Capacity" and "Memory Technology," but a non-catalog data source may instead use an attribute-value pair of {Memory-128 MB DDR SDRAM}. In this example, determining the attribute-value pair extractions 232 from the original attribute-value pair {Memory-128 MB DDR SDRAM} may result in two machine-learned attribute-value pairs based on the catalog attribute names: {Memory Capacity-128} and {Memory Technology-DDR SDRAM}.

In some embodiments, determining attribute-value pair extraction 232 may be based on learning a Hidden Markov Model (HMM) for each data source attribute. A state space of the HMM may be reduced based on catalog-to-source attribute correspondences determined from historical product information as determined in the block 230. In some embodiments, determining attribute-value pair extraction 232 may be based on other text parsing techniques or methods. Of course, other embodiments of determining attribute-value pair extraction 232 may be additionally or alternatively be contemplated and used in conjunction with the method 200.

The method 200 may include clustering product information 235. Clustering product information 235 may include clustering or grouping product information that corresponds to a same product by comparing attribute names and attribute values so that a similarity between names and/or values within a cluster is maximized and a similarity between various clusters is minimized. Clustering product information 235 may include using taxonomy and/or data modeling and domain expert input techniques. Generally, clustering 235 may be performed on incoming product information, although in some embodiments, clustering may additionally or alternatively be performed on historical product information (either simultaneously or at different times during an execution of the method 200). In some embodiments, clustering product information 235 may include determining distances between attribute-value pairs of different data sources based on source-to-source attribute correspondence 230. For example, if represents an attribute-value pair {-} from a non-catalog data source instance and represents an attribute-value pair {-} from a non-catalog data source instance where i is not equal to j, then the distance between {-} and {-} may be determined by:

$$\text{Dist}(AV_i, AV_j) = \text{Dist}(A_i, A_j)\cos(v_i, v_j) \quad (4)$$

where may be the attribute distance for the attribute correspondence that involves and (as previously discussed), and may be the cosine similarity between and.

In some embodiments, clustering product information 235 may be based on determining a distance between data source instances or offerings. For example, the instances or offerings and may be determined as a weighted average of the similarity of the corresponding values of and where the weights may correspond to the distance between the attribute names from the attribute correspondences:

$$\text{Dist}(o_i, o_j) = \frac{\sum AV_i \in \text{Attrs}(o_i), AV_j \in \text{Attrs}(o_j)\text{Dist}(AV_i, AV_j)}{\sum A_i \in \text{AttrNames}(o_i), A_j \in \text{AttrNames}(o_j)\text{Dist}(A_i, A_j)} \quad (5)$$

where Attrs(o) may be a set of all the attribute-value pairs of instance o, and AttrNames(o) may be the set of all attribute names in attribute-value pairs of instance o. In some embodiments, clustering product information 235 may alternatively or additionally include determining distances between textual descriptions of the different data sources based on cosine similarity comparisons. Of course, other embodiments of determining attribute-value pair and/or textual description distances, and indeed, of clustering product information 235 may be contemplated and used in conjunction with the method 200.

In some embodiments, the clustering 235 may include both determining distances between attribute-value pairs and determining distances between textual descriptions by using hierarchical agglomerative cluster (HAC) algorithms (for example, as described in The Elements of Statistical Learning. New York, N.Y. USA: Springer-Verlag, 2001, by T. Hastie, R. Tibshirani, and J. Friedman). Each product instance from a particular data source may be placed into an individual cluster, and clusters that have the highest similarity may be repeatedly merged until no clusters have a similarity higher than a pre-determined or selected stopping criteria. The HAC algorithm may be performed once using attribute-value pairs in the product information, and then again based on textual description-based similarity. In these embodiments, clusters resulting from the two HAC algorithmic runs may be merged if they have an element in common. Representative cluster attribute names and their corresponding cluster attribute values may be determined for one or more clusters.

The method 200 may include extracting attribute-value pairs 238. Generally, extracting attribute-value pairs may be performed on incoming product information to determine an association of an attribute value from an instance of a non-catalog data source or a representative cluster attribute value to a catalog attribute name. The extracted attribute-value pair may be included into the schema of the on-line catalog. In some embodiments, extracting attribute-value pairs 238 may be based on determining attribute-value pair extraction 232.

The method 200 may include fusing incoming data or information 240. The term "fusing data" may also be referred to herein as "performing data fusion," and is generally understood as combining data from multiple sources and gathering that information in order to achieve inferences. Fusing incoming data 240 may include determining a representative value for a particular attribute in the on-line catalog, and may include using domain expert input. Typically, determining a representative value for the particular attribute in the on-line catalog 240 may include determining a representative attribute value from all attribute-value pairs corresponding to the particular attribute name in the catalog schema. In some embodiments, determining the representative value may include majority voting based on absolute or generalized attribute values. In one non-limiting example of voting based on absolute values, for an attribute name "Memory Capacity" corresponding to four attribute-value pairs {Memory Capacity-1024} and to one attribute-value pair {Memory Capacity-2048}, majority voting based on absolute values would determine "1024" to be the representative value for the attribute "Memory Capacity."

In another non-limiting example of fusing incoming data 240, exemplary incoming attribute-value pairs {Operating System-Windows Vista}, {Operating System-Microsoft Windows Vista} and {Operating System-Microsoft Vista} do not have an absolute majority for a representative value. However, for this example, majority voting based on generalized values may be performed to determine the representative value to be "Microsoft Windows Vista." Majority values based on generalized values may include constructing vectors for each attribute-value pair having a dimension equivalent to a size of a set of terms that include all possible values for the attribute. A centroid for the set of vectors may be determined, and the representative value for the attribute may be determined to be the attribute value that is closest in Euclidean distance to the centroid. As applied to this example, v1 may be "Windows Vista," v2 may be "Microsoft Windows Vista," and v3 may be "Microsoft Vista." As there are three possible values for the attribute "Operating System," the corresponding three-dimensional vectors may $\langle 0, 1, 1 \rangle$ for v1, $\langle 1, 1, 1 \rangle$ for v2 and $\langle 1, 0, 1 \rangle$ for v3. Thus, the centroid for this set of vectors $\langle 2/3, 2/3, 1 \rangle$, and the closest vector to the centroid is v2. Accordingly, in this example, "Microsoft Windows Vista" is determined, based on generalized values, to be the representative value for the attribute "Operating System."

The method 200 may include updating the on-line catalog 242 with the representative value. To continue the above example, the on-line catalog may be updated 242 to include an entry that describes a particular product with an operating system of "Microsoft Windows Vista" and a memory capacity of "1024." The entry may be a revised existing entry, or the entry may be a new entry, such as when a new product is added to the on-line catalog. The updated or new entry corresponding to the product may be included in the on-line catalog 242.

Updating the on-line catalog 242 may not be limited to only updating product entries, such as in catalog offers. In some embodiments, updating the on-line catalog 242 may additionally or alternatively include updating brand information, a product line, manufacturer's information, queries, reviews, or other information that is not directly tied to a specific product. For example, using the aforementioned "Microsoft Windows Vista" example, the brand "Microsoft," the product line "Vista" or "operating systems" may be updated with the representative value(s) in the on-line catalog.

The method 200 may include storing the updated entry 245 in a local or remote data storage location, such as memory 130 of computing device 110 or a remote data storage location accessible via network 171 and/or 173 of FIG. 1. The updated entry may be stored 245 for future retrieval.

The method 200 may optionally include conveying the updated entry 248, such as to a user. The updated entry may be conveyed, displayed or otherwise output 248 in a form that allows the user to access the updated entry. For example, the updated entry may be displayed on a screen, may be sent in an email or a feed to a user's computing device, may be output to an audio file, or may be conveyed using any other known method or mechanism.

FIG. 4 illustrates an example 400 of product information included in at least a portion of a new or updated catalog entry for a Hitachi computer product that may result from the method 200 of FIG. 2. Chart 402 is a representation of attributes and values of the Hitachi computer product as provided from a first merchant. Chart 410 is a representation of attributes and values of the same computer product as provided from a second merchant. Note that attribute names between the two merchants are not consistent, e.g. "Model" 402a and "Manufacturer's Part Number" 410a. Some of the same attribute values are associated with different attribute names between the charts 402 and 410, e.g. the speed of 7200 rpm is embedded in the "Title" 402b for the first merchant but is listed under a distinct attribute "RPM" 410b for the second merchant. The synthesis 415 of the product information from the first and the second merchants 402, 410 (such as performed by the method 200) may result in a succinct set of product information (e.g. attribute-value pairs) 420 to be included in a product entry of the product catalog. For instance, in the synthesized information 420, the manufacturer's part number is clearly delineated with the attribute "MPN" 420a and the speed of the computer is clearly delineated by a separate attribute "Storage Hard/Drive Spindle Speed" 420b, each with accurate attribute values 420c and 420d, respectively. Additionally, values that were embedded within the Title 402b of the first merchant are clearly delineated into specific, descriptive attribute-value pairs 420e, 420f, 420g. Of course, the synthesized information 420 is not limited to only the attribute names and values illustrated in FIG. 4, but may include additional and/or different attributes and values. Similarly, the synthesized information 420 is not limited to being synthesized from only two merchants 402, 410, but may be synthesized from any number and types of data sources. Also, note that while representations 402, 410 and 420 are shown in chart form, the representations may be of any form that represents attribute-value pairs.

Figure 5:
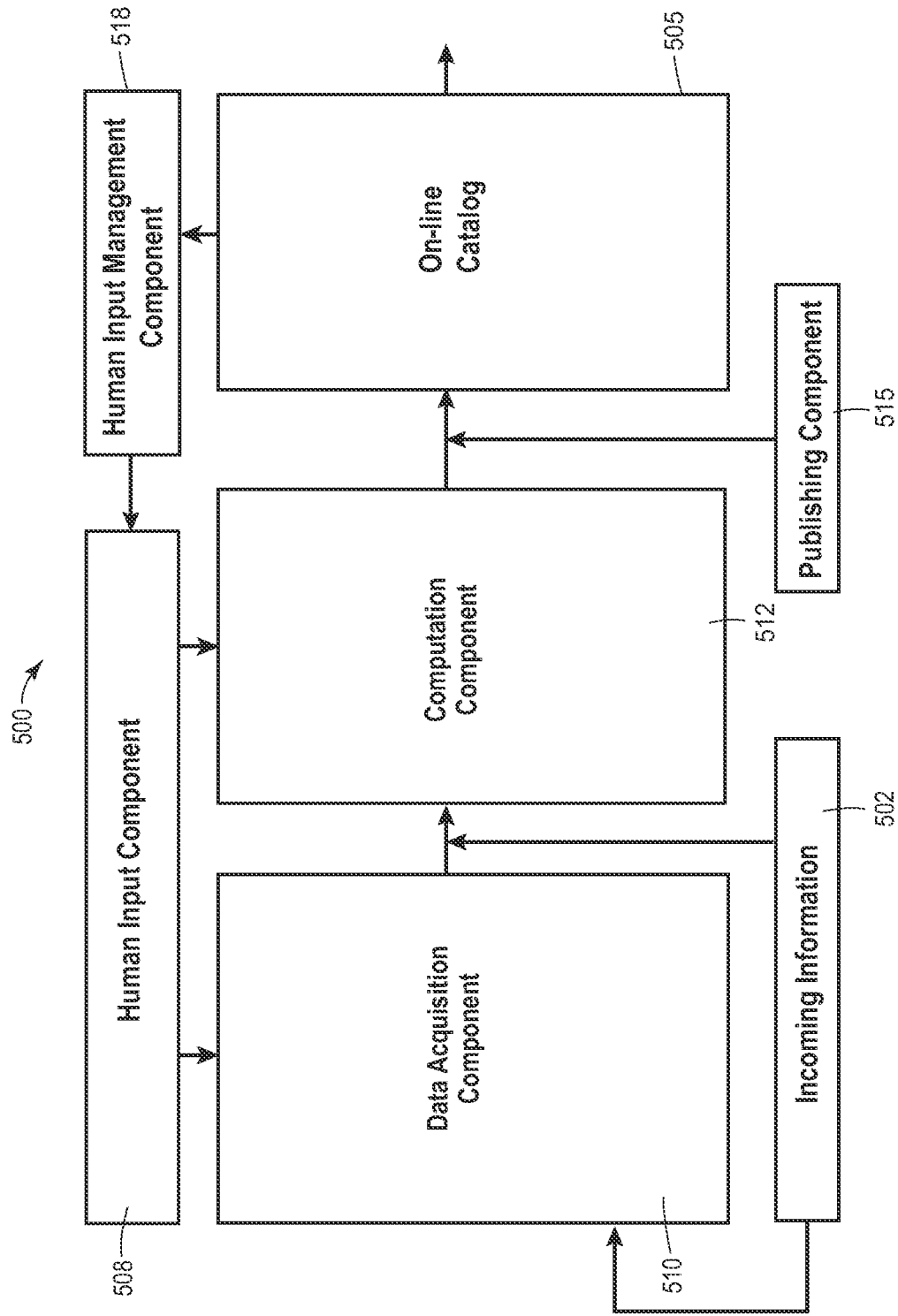
FIG. 5 is an embodiment of an exemplary system for automatically synthesizing product information from data sources into an on-line catalog.

FIG. 5 illustrates an exemplary system 500 for automatically synthesizing product information 502 from multiple data sources into an on-line catalog 505. Embodiments of the system 500 may operate in conjunction with embodiments of the method 200 of FIG. 2. The system 500 may include embodiments of one or more computing environments 100 or computing devices 110 as depicted in FIG. 1.

The system 500 may include a human input component 508, a data acquisition component 510, a computation component 512, and the on-line catalog 505. The system 500 may also include a publishing component 515, which may be a distinct component unto itself (as depicted in FIG. 5), or in some embodiments (not shown), at least some portion of the publishing component 515 may be included in the computation component 510 and/or in the on-line catalog 505. The publishing component 571 may be configured to update information in the catalog 505 (including attribute names and representative attribute values) so that a comprehensive description may be conveyed to a user. The system 500 may additionally include a human input management component 518.

Specific details of each of the components 502-518 will be described in more detail in subsequent sections and figures. In general, the system 500 may receive incoming information 502 corresponding to one or more existing and/or new products. The incoming information 502 may be received by the data acquisition component 510, and/or the incoming information may be received directly by the computation component 512.

The data acquisition component 510 and/or the computation component 512 may be configured to perform their various activities based on inputs, parameters, rules and/or other conditions conveyed by the human input component 508. The data acquisition component 510 may obtain incoming information 502 based on the human input component 508, and may process the incoming information 502 into a common taxonomy that may be used by the computation component 512. The computation component 512 may receive the processed, incoming information, and, based at least partly on input from the human input component 508, may determine relationships between various data points included in the incoming information as well as determine relationships between the incoming information and existing information in the catalog 505. The catalog 505 may be updated at least partially based on the relationships determined by the computation component 512.

The human input component 508 may be modified or updated at least partially based on input or information from the human input management component 518. The human input management component 518 may base the input or information conveyed to the human input component 508 at least partially based on information from the on-line catalog 505.

Figure 6:
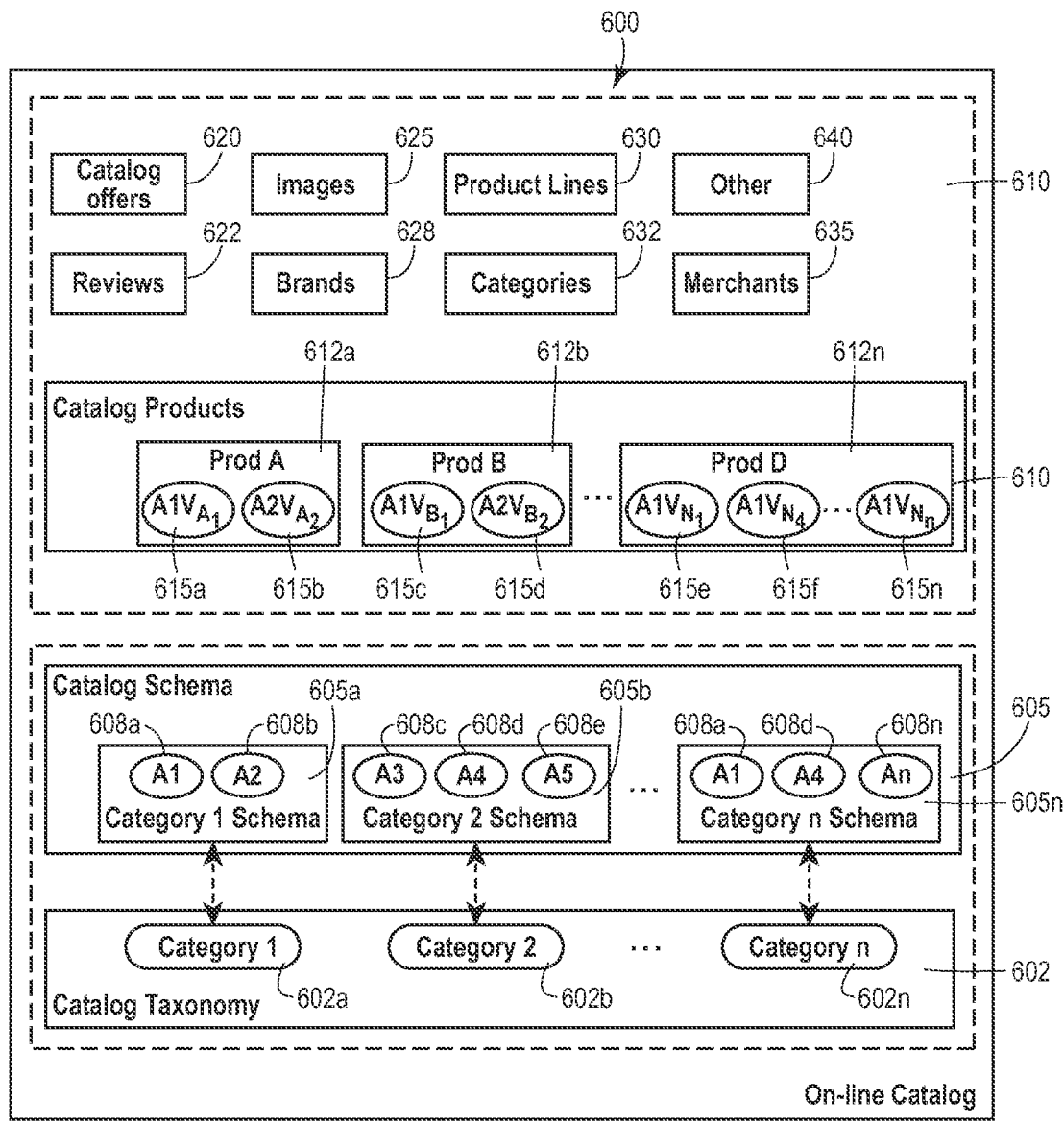
FIG. 6 illustrates an embodiment of the on-line catalog from FIG. 5.

FIG. 6 includes an embodiment of a detailed view 600 of the on-line catalog 505 of FIG. 5. The catalog 600 may utilize a catalog taxonomy 602 and a catalog schema 605. The catalog taxonomy may include a plurality of categories 602a, 602b, . . . , 602n. Each category 602a, 602b, . . . , 602n may have a corresponding category schema 605a, 605b, . . . , 605n included in the catalog schema 605. Each category schema 605a, 605b, . . . , 605n may include one or more catalog attribute names 608a-608n. Note that some attribute names (e.g. 608a, 608d) may be included in more than one category schema 605a, 605b, 605n. For example, an attribute name "size" may be included in both a category schema for "shirts" and in a different category schema for "flash drives."

Catalog content pertaining to products 610 may be based on the catalog taxonomy 602 and the catalog schema 605. In particular, the catalog content 610 may include a plurality of synthesized catalog entries 612a-612n, each corresponding to a particular catalog product. One non-limiting example of product information included in a synthesized catalog entry of the catalog 600 may be the synthesized information 420 of FIG. 4.

Each synthesized catalog entry 612a, 612b, 612c may include a corresponding set of attribute-value pairs 615a-615n based on a corresponding catalog schema 605a-605n. In FIG. 6, Product A (612a) corresponds to Category 1 (602a), whose schema 605a includes two attribute names 608a, 608b. Accordingly, the entry for Product A (612a) may include two attribute-value pairs 615a, 615b with attribute names 608a and 608b, respectively, and corresponding attribute values that are particular to Product A (612a), denoted by VA1 and VA2. Product B (612b) is another product from the same category 602a as Product A (612a). The attribute-value pairs 615c, 615d included in Product B's catalog entry (612b) may also include attribute names 608a and 608b corresponding to the category 605a, but may include different attribute values particular to Product B (612b), denoted by VB1 and VB2. For example, Product A may be a dress shirt with attribute-value pairs {size-large} and {color-white} and Product B may be a polo shirt with attribute-value pairs {size-medium} and {color-yellow}.

Product N (612n) included in the on-line catalog 600 corresponds to Category n (602n), whose schema 605n includes multiple attribute names 608a, 608d, . . . , 608n. Accordingly, the entry for Product D (612c) may include attribute-value pairs 615e, 615f, . . . , 615n having corresponding attribute values particular to Product D (612c), denoted by VN1, VN4, and VNn. Note that in spite of belonging to different categories (602a, 602n), Product A (612a) and Product N (612n) may share a common attribute name A1 (608a). Each of their corresponding attribute value pairs (615a, 615e), however, may have different attribute values VA1 and VN1. For example and not limitation, Product A may be a sweater with attribute-value pair {size-large} and Product B may be a running shoe with attribute-value pair {size-7}.

The catalog 600 may include other views 620, 622, 625, 628, 630, 632, 635, 640 of information corresponding to products such as catalog offers for sale 620, reviews 622, images 625 and the like. In some instances, the product entries 612 and/or other information 620, 622, 625 may be grouped, for example, to allow for easier customer navigation of the catalog 600. For example and not limitation, products may be grouped by brand names 628 (e.g. Hitachi, Dell, Lenovo, etc.), product lines 630 (e.g. entry-level, home computing, small business, etc.), categories 632 (e.g. laptops, desktops, servers, batteries, etc.), merchants 635 (e.g. Amazon, Battery World, Ebay, etc.), and/or other groupings 640. The informational views 620, 622, 625, 628, 630, 632, 635, 640 included in the catalog 600 may be based on the catalog schema 605 and the catalog taxonomy 602, and in some embodiments (not shown), may include attribute-value pairs similar to catalog products 612.

Figure 7:
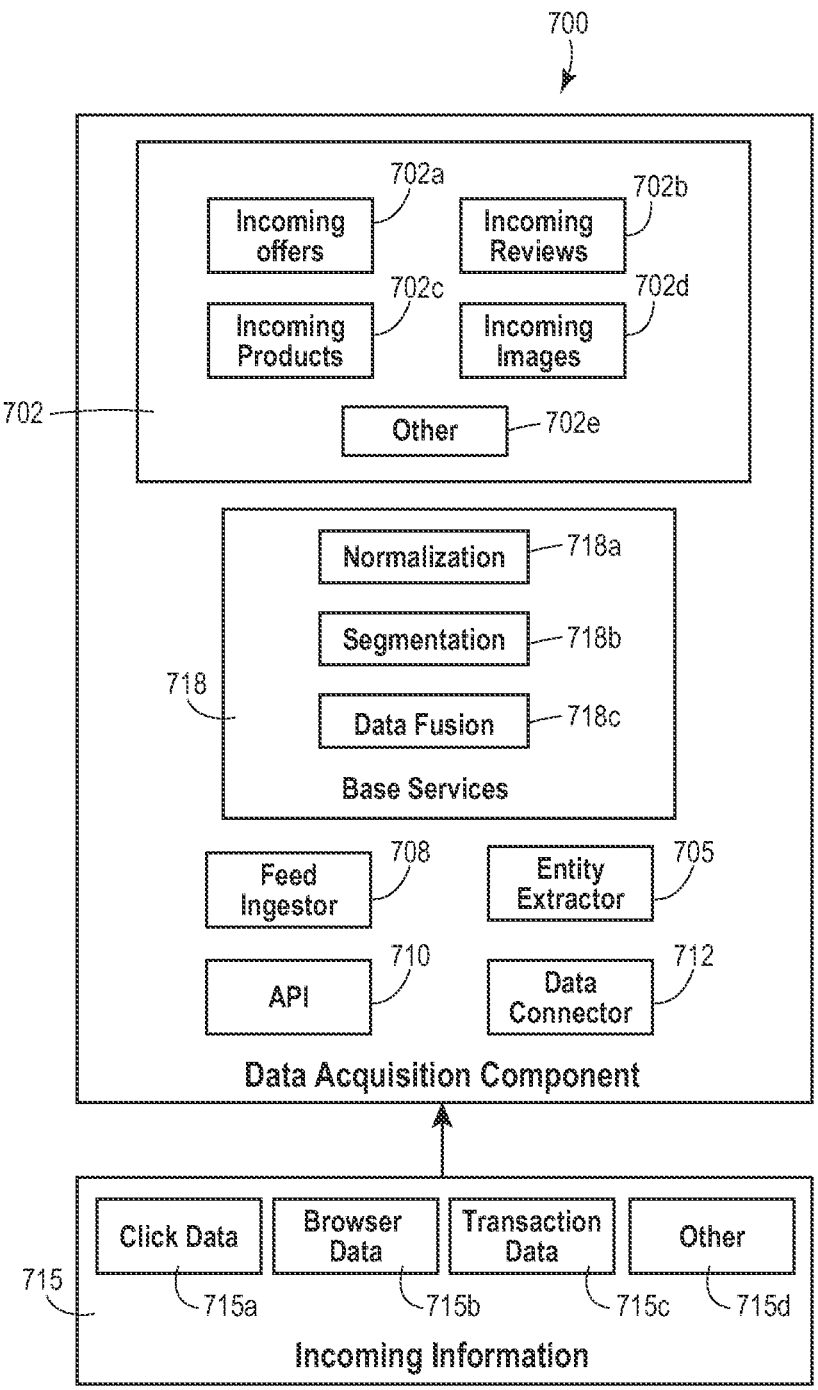
FIG. 7 illustrates an embodiment of the data acquisition component from FIG. 5.

The information included in the synthesized catalog product entries 612 and informational views 620, 622, 625, 628, 630, 632, 635, 640 included in the catalog 600 may be acquired from a plurality of electronic data sources. FIG. 7 illustrates an embodiment 700 of details of the data acquisition component 510 of FIG. 5. As previously discussed, the data acquisition component 700 may obtain incoming information 502 based on the human input component 508 and may process the incoming information 502 into a common taxonomy that may be used by the computation component 512. In the embodiment 700 of the data acquisition component 510, at least a portion of the information synthesized into catalog products 610 and informational views 620, 622, 625, 628, 630, 635, 640 generally may be obtained from incoming content-type information 702 originating from third-party electronic data sources, such as offers for sale 702a, reviews 702b, third-party product descriptions 702c, images 702d, and other such third-party information 702e previously discussed with respect to FIG. 2.

The third-party content-type information 702 may be obtained via the data acquisition component 700. In particular, the data acquisition component 700 may be configured with an entity extraction component (e.g. entity extractor) 705 enabled to crawl or scrape the Internet and/or other public and/or private websites and data sources to extract the content-type information 702. The data acquisition component 700 may be additionally or alternatively configured with a feed ingestion component (e.g. feed ingestor) 708 enabled to receive data feeds (e.g. RSS feeds, Atom format feeds, etc.) from the third-party data sources.

In some embodiments, the data acquisition component 700 may expose an API (Application Programming Interface) 710 for performing entity data extraction 705 and/or feed ingestion 708. The API 710 may allow a specification or a selection of targets or types thereof to be extracted 705 and/or ingested 708. The API 710 may allow for specifying one or more periodicities of data acquisition, either on a target basis, a function basis (e.g. extract, receive feed, etc.), or both. In some embodiments, the data acquisition component may include one or more data connectors 712. In some embodiments, the same API 710 or a different API may be exposed for accessing the data connectors 712.

In addition to content-type information 702, action-type information 715 may also be received by the data acquisition component 700. In FIG. 7, the action-type information 715 is depicted as being included in the incoming information 502 of FIG. 5. The action-type information 715 generally may be derived or inferred from electronic actions, and in particular, from popularity signals or popularity data. For example, the action-type information 715 may be derived from click data 715a, browser data 715b (e.g. web browser tool bar data), transaction data 715c, or other action-type data 715d such as previously discussed with respect to FIG. 2. In some embodiments, the data acquisition component 700 may acquire the action-type data 715 via the data connectors 712. In some embodiments, at least some portion of the action-type data 715 may be additionally or alternatively received directly by the computation component 512 of FIG. 5. In some embodiments, the action-type data 715 may be received by the system 500 in a derived state. In some embodiments the action-type data 715 may be received by the system 500 in an un-derived or raw state, and at least one of the data acquisition component 510, the computation component 512 or some other component of the system 500 may perform derivations on the received action-type data 715 to obtain attribute-value pairs.

The data acquisition component 700 may include base services 718. Base services 718 may include a normalization component 718a, a segmentation component 718b and a data fusion component 718c. In the embodiment 700 of FIG. 7, the components 718a, 718b and 718c may be configured to perform at least the blocks 222, 225 and 240 of the method 200, respectively.

Figure 8:
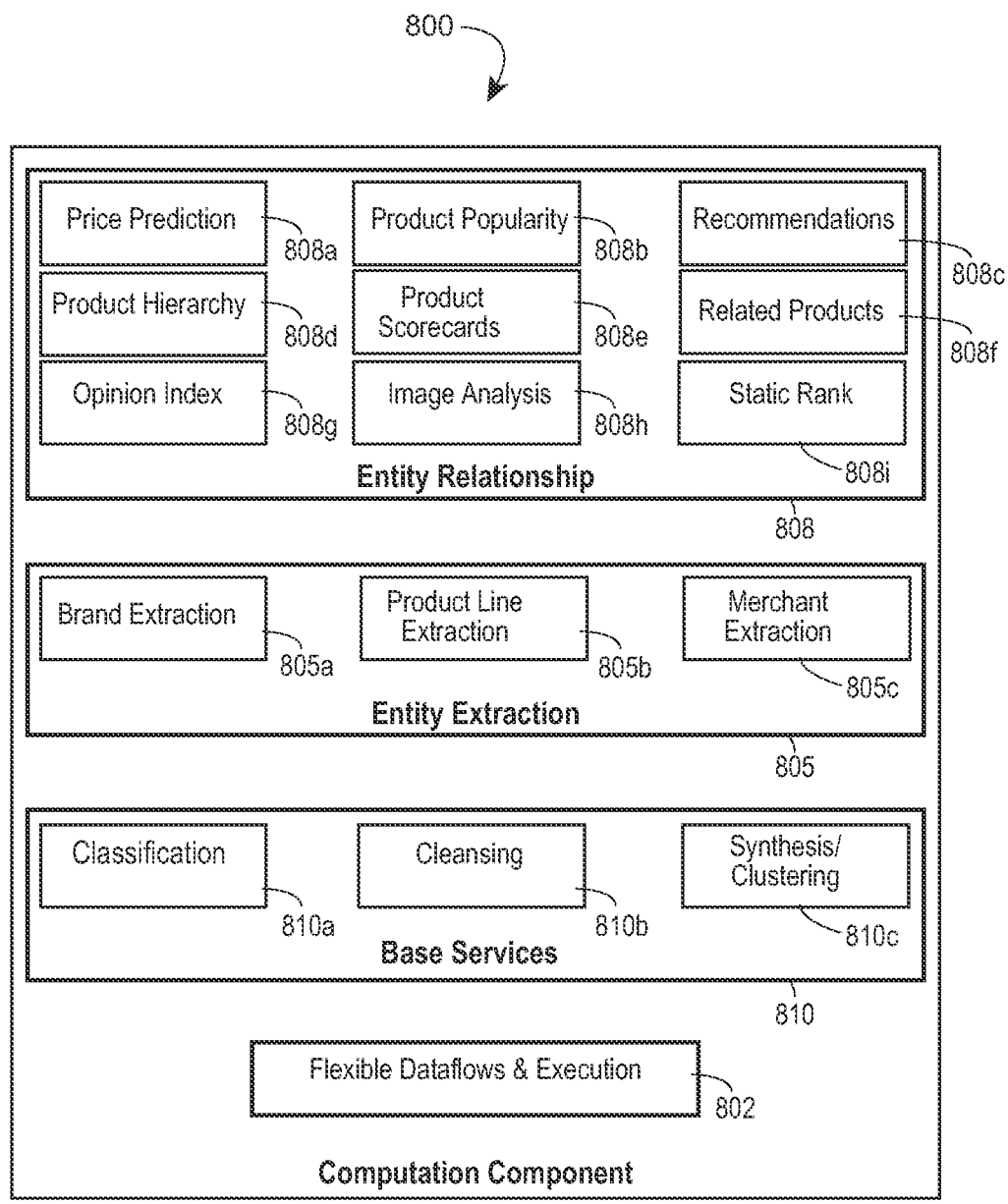
FIG. 8 illustrates an embodiment of the computation component of FIG. 5.

FIG. 8 illustrates an embodiment 800 of the computation component 512 of FIG. 5. As previously discussed, the computation component 800 may receive incoming information from the data acquisition component 510, and, based at least partly on the human input component 508, may determine relationships between various data points included in the incoming information as well as determine relationships between the incoming information and existing information in the catalog 505. Accordingly, the computation component 800 may include a dataflow component 802 enabled to configure and execute flexible data flows. The dataflow component 802 may support entity extraction 805, determination of entity relationships 808, base services 810 and other components (not shown) of the computation component 800.

The computation component 800 may include an entity extraction component 805. The entity extraction component may be configured to perform extraction-type functions, such as determining attribute-value pair extraction 232 and/or extracting attribute value-pairs 238 of the method 200. The entity extraction component 805 may include subcomponents to extract brands 805a of products, product lines 805b, or merchants of products 805c from historical and/or incoming product information.

The computation component 800 may include a set of base services 810. The set of base services 810 may include a classification component 810a, a cleansing component 810b, and a synthesis or clustering component 810c. In the embodiment of FIG. 8, the components 810a, 810b and 810c may be configured to perform at least the blocks 228, 220 and 235 of the method 200, respectively. In some embodiments, the computation component 800 may include one or more of the base services 718 illustrated in the data acquisition component 700 of FIG. 7. Conversely, in some embodiments, the data acquisition component 700 may include one or more of the base services 810 illustrated in the computation component 800 of FIG. 8.

The computation component 800 may include an entity relationship component 808. The entity relationship component 808 may be configured to operate on the incoming product information 502, 702, and/or 715 to determine data relationships. In some embodiments, the entity relationship component may determine source-to-source correspondences and/or source-to-catalog correspondences, such as previously discussed with regard to the block 230 of FIG. 2. In the embodiment illustrated by FIG. 8, the entity relationship component 808 may obtain and determine relationships based on price prediction signals or data 808a, rankings of products 808b, recommendations 808c, product hierarchies 808d (e.g. which products are listed higher on web pages or lists), product scorecards 808e, related products 808f, opinion indexes 808g, image analyses 808h, and/or static ranks 808i. In some embodiments, relationships may be determined from additional or alternative obtained information not shown in FIG. 8. In some embodiments, the entity relationship component 808 may use machine learning, trend analysis and forecasting, sentiment extraction, or linguistic analysis to determine data relationships. In some embodiments, the entity relationship component 808 may use clustering and data mining techniques (separate and distinct from synthesis and clustering of information targeted for inclusion in the catalog 810c) to determine data relationships, such as for product popularity and/or price prediction.

Figures 9, 10:
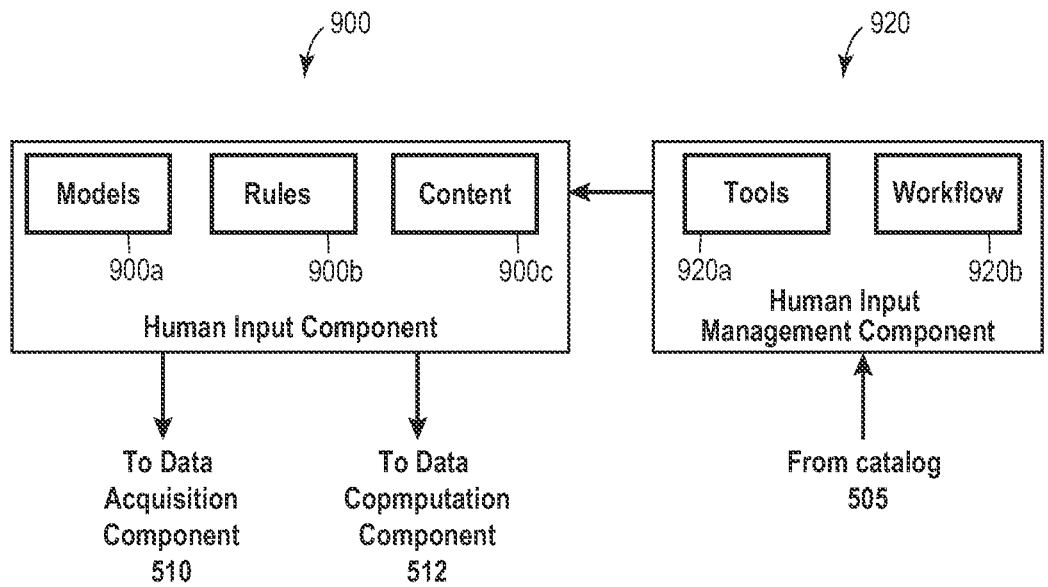
FIG. 9 illustrates embodiments of the human input component and the human input management components from FIG. 5.
FIG. 10 includes a chart detailing update frequencies and scales of input data for various data sources for an embodiment of the system of FIG. 5.

FIG. 9 depicts embodiments 900 and 920 of the human input component 508 and the human input management component 518, respectively, of FIG. 5. The human input management component 920 may include tools 920a and workflow management 920b functions. The human input management component 920 may be at least partially based on the on-line product catalog 505, and may use the tools 920a and workflow management 920b to provide post-analysis of synthesized information from the on-line catalog 502, such as post-catalog analysis of the information 612, 620, 622, 625, 628, 630, 632, 635, and/or 640 of FIG. 6.

The system 500 may include an embodiment 900 of the human input component 508. The human input component 900 may include models 900a, rules 900b and content 900c, of which some or all may be adjusted based at least partially upon the post-analysis performed by the human input management component 920. The human input 900 may be rendered electronically and may shape or provide boundaries or constraints for the data acquisition component 510 and/or for the computation component 512. For example, and not limitation the human input content 900c may indicate which products are to be included into the catalog 505, e.g. include shoe products but not shoelace products. The human models 900a may provide, for example, models based on marketing research or other factors for classification (e.g. block 810a of FIG. 8) or organization of the obtained information. The human input rules 900b may indicate, for example, rules for obtaining data from product feeds (e.g. block 708 of FIG. 7) at a first frequency or periodicity, and updating popularity signals or data (e.g. block 715 of FIG. 7) at a second frequency or periodicity. The human input component 900 may include domain expert human input and/or non-expert human input.

FIG. 10 includes a chart 1000 detailing update frequencies 1002 for various data sources 1005 in one embodiment of the system 500 that was reduced to practice. The chart 1000 also details the scales of input data, or the number of various data sources 1008 from which information was obtained at each update.

In conclusion, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:

1. A computer implemented method of automatically synthesizing product information from multiple data sources into an on-line catalog, comprising, as implemented on a computer:
   obtaining historical information corresponding to an existing product represented in the on-line catalog from a plurality of historical data sources, the historical information comprising a plurality of historical attribute-value pairs, and each historical attribute-value pair comprising a historical attribute name and a corresponding historical attribute value;
   determining a correspondence between a first historical attribute name included in a first historical product schema of a first historical data source and a first catalog attribute name of the existing product included in a catalog schema of the on-line catalog, the catalog schema comprising a plurality of catalog attribute-value pairs, and each catalog attribute-value pair comprising a different catalog attribute name and a corresponding catalog attribute value, wherein the first historical attribute name and the first catalog attribute name are not the same name;
   wherein determining the correspondence between the first historical attribute name included in the first historical product schema of the first historical data source and the first catalog attribute name of the existing product included in the catalog schema of the on-line catalog comprises:
      obtaining a range of words for each of the first historical attribute name and the first catalog attribute name;
      determining a value distance between the range of words for each of the first historical attribute name and the first catalog attribute name; and
      identifying pairs of words between words of the range of words for each of the first historical attribute name and the first catalog attribute name whose value distance falls below a given threshold;
      wherein the identified pairs comprise the correspondence between the first historical attribute name included in the first historical product schema of the first historical data source and the first catalog attribute name of the existing product included in the catalog schema of the on-line catalog;
   determining an association between the first catalog attribute name and at least part of a first historical attribute value corresponding to the first historical attribute name of the first historical data source; and
   storing the existing association between the first catalog attribute name and the at least part of the first historical attribute value corresponding to the first historical attribute name of the first historical data source in the catalog schema;
   wherein obtaining the incoming and the historical information from the plurality of incoming and historical data sources comprises obtaining unstructured data and structured data in a plurality of different schemas from the plurality of incoming and historical data sources.

2. The computer implemented method of claim 1, wherein obtaining historical information corresponding to an existing product represented in the on-line catalog from a plurality of historical data sources comprises obtaining the historical information via at least one of feed ingestion or entity extraction from a website from at least one of a review sentiment, a review rating, a review helpfulness indicator, a Frequently Asked Question (FAQ), adjectives corresponding to products, a question and answer, a related product, a video, or a price prediction signal.

3. The computer implemented method of claim 2, wherein obtaining the historical information further comprises obtaining the historical information from at least one of an offer for sale, click data, an image, a product rank, specification information, a recommendation, a product hierarchy, a product scorecard, an opinion index, or a product manual.

4. The computer implemented method of claim 1 further comprising normalizing the incoming attribute names and the incoming attribute values based on the catalog schema and a catalog taxonomy corresponding to the on-line catalog.

5. The computer implemented method of claim 1 further comprising classifying the incoming information into one or more categories of a catalog taxonomy, and wherein the catalog schema comprises a different category schema for each of the one or more categories.

6. The computer implemented method of claim 1 further comprising obtaining updated historical information from at least one of the plurality of historical data sources at least twice daily, and obtaining updated historical information from all of the plurality of data sources at least monthly.

7. A computer readable storage medium bearing computer executable instructions which, when executed on a computing system comprising at least a processor retrieved from the medium, carry out a method for automatically synthesizing products into an on-line catalog, the method comprising:
obtaining historical information corresponding to an existing product represented in the on-line catalog from a plurality of historical data sources, the historical information comprising a plurality of historical attribute-value pairs, and each historical attribute-value pair comprising a historical attribute name and a corresponding historical attribute value;
determining a correspondence between a first historical attribute name included in a first historical product schema of a first historical data source and a first catalog attribute name of the existing product included in a catalog schema of the on-line catalog, the catalog schema comprising a plurality of catalog attribute-value pairs, and each catalog attribute-value pair comprising a different catalog attribute name and a corresponding catalog attribute value, wherein the first historical attribute name and the first catalog attribute name are not the same name;
wherein determining the correspondence between the first historical attribute name included in the first historical product schema of the first historical data source and the first catalog attribute name of the existing product included in the catalog schema of the on-line catalog comprises:
obtaining a range of words for each of the first historical attribute name and the first catalog attribute name;
determining a value distance between the range of words for each of the first historical attribute name and the first catalog attribute name; and
identifying pairs of words between words of the range of words for each of the first historical attribute name and the first catalog attribute name whose value distance falls below a given threshold;
wherein the identified pairs comprise the correspondence between the first historical attribute name included in the first historical product schema of the first historical data source and the first catalog attribute name of the existing product included in the catalog schema of the on-line catalog;
determining an association between the first catalog attribute name and at least part of a first historical attribute value corresponding to the first historical attribute name of the first historical data source; and
storing the existing association between the first catalog attribute name and the at least part of the first historical attribute value corresponding to the first historical attribute name of the first historical data source in the catalog schema;
wherein obtaining the incoming and the historical information from the plurality of incoming and historical data sources comprises obtaining unstructured data and structured data in a plurality of different schemas from the plurality of incoming and historical data sources.

8. The computer readable storage medium of claim 7, wherein obtaining historical information corresponding to an existing product represented in the on-line catalog from a plurality of historical data sources comprises obtaining the historical information via at least one of feed ingestion or entity extraction from a website from at least one of a review sentiment, a review rating, a review helpfulness indicator, a Frequently Asked Question (FAQ), adjectives corresponding to products, a question and answer, a related product, a video, or a price prediction signal.

9. The computer readable storage medium of claim 7, wherein obtaining the historical information further comprises obtaining the historical information from at least one of an offer for sale, click data, an image, a product rank, specification information, a recommendation, a product hierarchy, a product scorecard, an opinion index, or a product manual.

10. The computer readable storage medium of claim 7, wherein the method further comprises normalizing the incoming attribute names and the incoming attribute values based on the catalog schema and a catalog taxonomy corresponding to the on-line catalog.

11. The computer readable storage medium of claim 7 further comprising additional computer executable instructions for automatically synthesizing information corresponding to new products into the on-line catalog.

12. The computer readable storage medium of claim 7, wherein the method further comprises classifying the incoming information into one or more categories of a catalog taxonomy, and wherein the catalog schema comprises a different category schema for each of the one or more categories.

13. The computer readable storage medium of claim 7, wherein the method further comprises obtaining updated historical information from at least one of the plurality of historical data sources at least twice daily, and obtaining updated historical information from all of the plurality of data sources at least monthly.

14. A system for automatically synthesizing product information into an on line catalog, the system comprising a computing device having at least a processor and a memory, and computer-executable instructions stored by the memory and executable by the processor, wherein the system is configured to:
obtain historical information corresponding to an existing product represented in the on-line catalog from a plurality of historical data sources, the historical information comprising a plurality of historical attribute-value pairs, and each historical attribute-value pair comprising a historical attribute name and a corresponding historical attribute value;
determine a correspondence between a first historical attribute name included in a first historical product schema of a first historical data source and a first catalog attribute name of the existing product included in a catalog schema of the on-line catalog, the catalog schema comprising a plurality of catalog attribute-value pairs, and each catalog attribute-value pair comprising a different catalog attribute name and a corresponding catalog attribute value, wherein the first historical attribute name and the first catalog attribute name are not the same name;
wherein the system determines the correspondence between the first historical attribute name included in the first historical product schema of the first historical data source and the first catalog attribute name of the existing product included in the catalog schema of the on-line catalog by:
obtaining a range of words for each of the first historical attribute name and the first catalog attribute name;
determining a value distance between the range of words for each of the first historical attribute name and the first catalog attribute name; and identifying pairs of words between words of the range of words for each of the first historical attribute name and the first catalog attribute name whose value distance falls below a given threshold;

wherein the identified pairs comprise the correspondence between the first historical attribute name included in the first historical product schema of the first historical data source and the first catalog attribute name of the existing product included in the catalog schema of the on-line catalog;

determine an association between the first catalog attribute name and at least part of a first historical attribute value corresponding to the first historical attribute name of the first historical data source; and store the existing association between the first catalog attribute name and the at least part of the first historical attribute value corresponding to the first historical attribute name of the first historical data source in the catalog schema;

wherein obtaining the incoming and the historical information from the plurality of incoming and historical data sources comprises obtaining unstructured data and structured data in a plurality of different schemas from the plurality of incoming and historical data sources.

15. The system of claim 14, wherein the system obtains historical information corresponding to an existing product represented in the on-line catalog from a plurality of historical data sources comprises obtaining the historical information via at least one of feed ingestion or entity extraction from a website from at least one of a review sentiment, a review rating, a review helpfulness indicator, a Frequently Asked Question (FAQ), adjectives corresponding to products, a question and answer, a related product, a video, or a price prediction signal.

16. The system of claim 14, wherein the system further obtains historical information by obtaining the historical information from at least one of an offer for sale, click data, an image, a product rank, specification information, a recommendation, a product hierarchy, a product scorecard, an opinion index, or a product manual.

17. The system of claim 14, wherein the system is further configured to normalize the incoming attribute names and the incoming attribute values based on the catalog schema and a catalog taxonomy corresponding to the on-line catalog.

18. The system of claim 14, wherein the system further comprises additional computer executable instructions stored in the memory for automatically synthesizing information corresponding to new products into the on-line catalog.

19. The system of claim 14, wherein the system is further configured to classify the incoming information into one or more categories of a catalog taxonomy, and wherein the catalog schema comprises a different category schema for each of the one or more categories.

20. The system of claim 14, wherein the system is further configured to obtain updated historical information from at least one of the plurality of historical data sources at least twice daily, and obtaining updated historical information from all of the plurality of data sources at least monthly.

* * * * *